Patented June 6, 1950

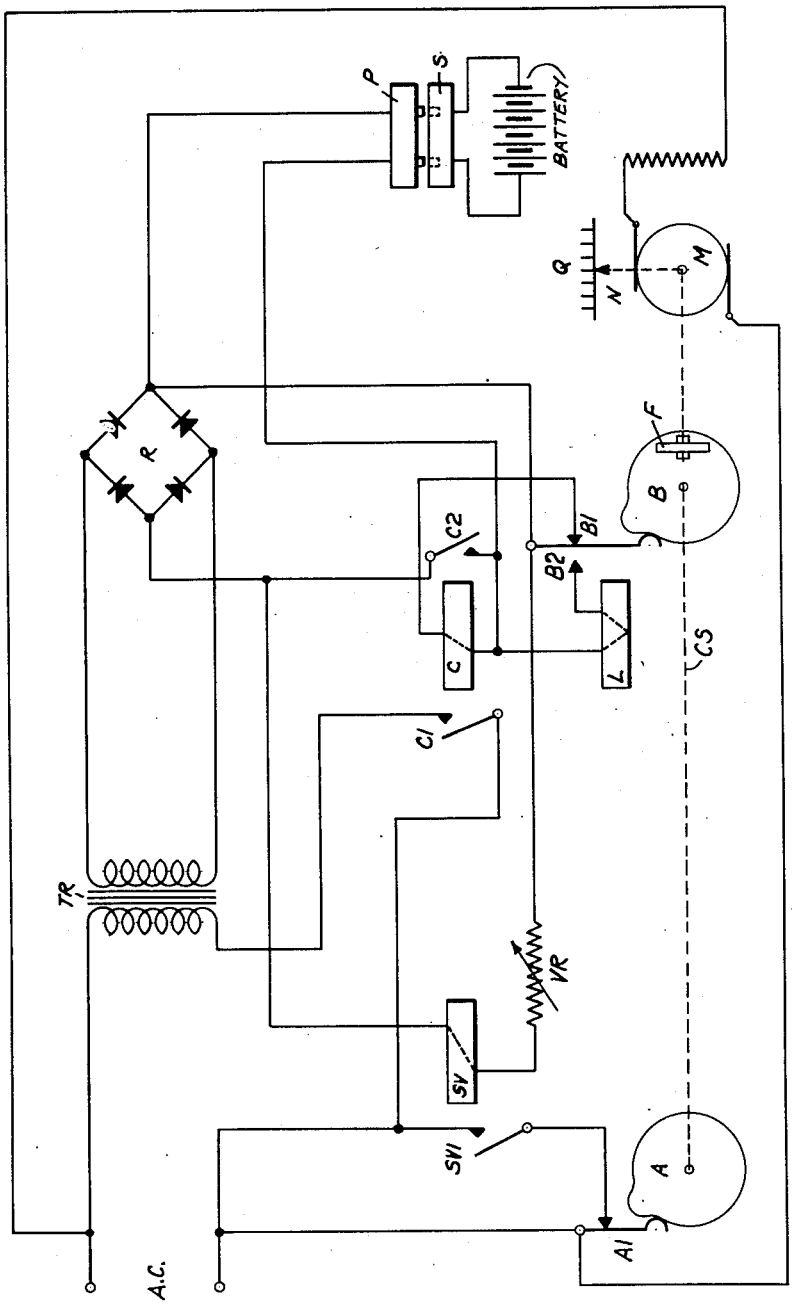

UNITED STATES PATENT OFFICE 2,510,141

CHARGING SECONDARY ELECTRIC BATTERIES

Edward Arthur Richards, London, England, assignor to International Standard Electric Corporation, New York, N. Y., a corporation of Delaware Application April 5, 1947, Serial No. 739,618
In Great Britain February 16, 1940

Section 1, Public Law 690, August 8, 1946
Patent expires February 16, 1960

3 Claims. (Cl. 320—34)

The present invention relates to arrangements for charging secondary electric batteries, and an object is to provide a charging arrangement which will prove simpler to use than those hitherto employed.

According to the invention, in an arrangement for charging secondary electric batteries means is provided for giving a battery a further charge of predetermined duration after its voltage has risen to a particular value.

An embodiment of the invention will now be described by way of example, reference being made to the accompanying drawing which is a schematic diagram of a battery charging arrangement for operation from alternating current supply means.

The arrangement shown is provided with terminals AC for connecting it to alternating current supply mains, a transformer TR and a rectifier R (preferably a static contact rectifier) which is fed with alternating current from the transformer TR and feeds rectified current to the battery to be charged over a plug P arranged to plug into a socket S connected to the battery. This plug and socket arrangement is particularly intended for the charging of electric vehicle batteries, in which case the socket S is mounted on the vehicle and the plug P terminates a flexible cable attached to the rectifier set. The only manual action necessary to effect a correct charging of the battery is to insert the plug P into the socket S, the remaining operations take place automatically.

When the plug P is inserted into the socket S, an energizing circuit is completed from the battery over socket S, plug P and contacts B1 for a relay C which thereupon closes its contacts C1 and C2. Contacts C1 close the primary circuit of the transformer TR and contacts C2 connect the output circuit of rectifier R to the battery. Charging now proceeds continuously, the value of the charging current depending upon the voltage applied to the rectifier R, the construction of the rectifier R, and the state of charge of the battery. When the battery voltage reaches a particular value, a voltage relay SV operates and contacts SV1 which connects a synchronous motor SM to the alternating current terminals AC to set it in rotation.

It is now a well-established principle in battery charging that complete charging of a secondary battery can be ensured by arranging that it is charged at a predetermined average rate until it has attained a particular voltage corresponding to approximately 2.35 volts per cell after which it is supplied with an additional quantity of electricity which quantity depends only upon the capacity of the battery. For this purpose the charging is allowed to continue after the battery has attained the specified voltage and until the battery has received the requisite additional quantity of electricity. The charging rate which obtains when the specified voltage has been reached is the same irrespective of the capacity of the battery in this system, so that in cases where the batteries to be charged are all of the same capacity it is only necessary to allow the charging to continue for a fixed period which depends upon the value of that capacity. In cases where the capacities of the batteries are not all the same it is necessary to provide a manual adjustment for enabling the period of the additional charge to be adjusted to correspond with the capacity of the battery being charged.

In the arrangement shown, the additional charging period is automatically measured and terminated by means of the synchronous motor SM which is started in rotation by the operation of relay SV, and which by means of a friction wheel F rotates a pair of cams A and B mounted on a common spindle.

The driving means SM, F is such that the cams A, B make one complete revolution in the time allotted to the additional charging period. When the cam B has made almost a complete revolution, it operates the spring B1 which connects an electromagnet L across the battery in place of relay C. Relay C releases and opens contacts C1 and C2, thereby cutting off the charging circuit and releasing the relay SV. The motor M continues to rotate, however, because its circuit is maintained closed by the spring A1. When the cams A and B reach their original starting position, the projection on cam A engages the spring A1 to open the circuit of motor SM which thereupon stops. Magnet L is maintained energised from the battery and holds open the circuit of relay C at spring B1. When the plug P is withdrawn from the socket S, the magnet L de-energises and the circuit is then in readiness to charge another battery.

If it is desired to alter the length of time for which a battery is charged after the specified voltage has been reached, the cover of the rectifier set is removed and the speed of rotation of the cams A and B is adjusted by hand. The desired adjustment is effected by moving the motor SM laterally until a pointer N secured to the motor SM is opposite the appropriate graduation on a scale Q. This alters the position of the friction wheel F on the cam B and thus changes the speed ratio between the motor SM and cams A, B.

Having now particularly described and ascertained the nature of my said invention and in what manner the same is to be performed, I declare that what I claim is:

1. A battery charging system comprising a source of alternating current, rectifying means connected to said source, means for connecting the output of said rectifying means to the terminals of the battery to be charged, said means including a first electromagnetic relay, said first relay having circuit connections for connecting the same across the terminals of the battery to be charged and adapted to be energized thereby, said relay having contacts for applying said source to said rectifying means, an electromagnet, a first switch means having two positions, one of the positions thereof providing a series connection between a battery to be charged and said first relay, the other position of said switch providing a series connection between the battery to be charged and said electromagnet, a pair of rotatable cam members, means to drive said cam members, a second electromagnetic relay serially connected in circuit between the battery to be charged and said first named means, said relay adapted to become energized when the battery to be charged acquires a predetermined charge, a second switch means shunt connected with contacts associated with said second relay and serially connected between said source and said driving means, each of said cam members adapted to alter the position respectively of each of said switches after the lapse of a predetermined time interval following the energization of said second relay, said first switch being held in its second position by said electromagnet.

2. A battery charging system as claimed in claim 1 wherein said second relay includes a variable resistance to control the voltage value at which said relay becomes energized.

3. A battery charging system as claimed in claim 2 wherein means are provided for varying the speed at which said driving means rotates the cam member associated with said first switch.

EDWARD ARTHUR RICHARDS.

REFERENCES CITED

The following references are of record in the file of this patent:

UNITED STATES PATENTS

| Number | Name | Date |
| --- | --- | --- |
| 374,673 | Griscom | Dec. 13, 1887 |
| 1,439,893 | Horton | Dec. 26, 1922 |
| 1,538,588 | Pohler | May 10, 1925 |
| 1,577,028 | Horton | Mar. 16, 1926 |
| 1,812,628 | Geiger | June 30, 1931 |
| 2,165,174 | Bridges et al. | July 4, 1939 |
| 2,227,118 | Amsden | Dec. 31, 1940 |
| 2,272,745 | Hinds et al. | Feb. 10, 1942 |
| 2,285,620 | Sears | June 9, 1942 |
| 2,334,289 | Richards | Nov. 16, 1943 |